United States Patent
Malmin

(10) Patent No.: US 8,957,397 B2
(45) Date of Patent: Feb. 17, 2015

(54) MULTILAYER, MULTIAPERTURE COLLIMATOR FOR MEDICAL IMAGING AND FABRICATION METHOD

(75) Inventor: Ronald E. Malmin, Chicago, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 0 days.

(21) Appl. No.: 13/586,910

(22) Filed: Aug. 16, 2012

(65) Prior Publication Data

US 2013/0075630 A1 Mar. 28, 2013

Related U.S. Application Data

(60) Provisional application No. 61/539,015, filed on Sep. 26, 2011.

(51) Int. Cl.

| | | |
|---|---|---|
| B23H 7/02 | (2006.01) | |
| B23H 9/00 | (2006.01) | |
| G21K 1/02 | (2006.01) | |
| B23K 26/36 | (2014.01) | |
| B23K 26/40 | (2014.01) | |
| B23H 1/00 | (2006.01) | |

(52) U.S. Cl.
CPC .. B23H 9/00 (2013.01); B23H 1/00 (2013.01); G21K 1/025 (2013.01); B23H 7/02 (2013.01); B23K 26/367 (2013.01); B23K 26/401 (2013.01); B23K 26/4015 (2013.01)
USPC ............... 250/503.1; 250/505.1; 359/484.09; 359/566

(58) Field of Classification Search
CPC ......... G21K 1/062; G21K 1/025; G21K 1/02; G21K 1/10; G21K 2201/061; G21K 2201/067; G21K 2201/068
USPC ................ 359/566, 484, 9; 250/503.1, 505.1
See application file for complete search history.

(56) References Cited

U.S. PATENT DOCUMENTS

| | | | | |
|---|---|---|---|---|
| 5,198,680 | A * | 3/1993 | Kurakake | 378/147 |
| 6,377,661 | B1 * | 4/2002 | Guru et al. | 378/149 |
| 6,396,902 | B2 * | 5/2002 | Tybinkowski et al. | 378/150 |
| 7,236,655 | B2 * | 6/2007 | Momoki et al. | 385/11 |
| 7,310,411 | B2 * | 12/2007 | Tang et al. | 378/154 |
| 8,217,359 | B1 * | 7/2012 | Kross et al. | 250/370.09 |
| 2003/0072415 | A1 * | 4/2003 | Eidam et al. | 378/147 |
| 2003/0156325 | A1 * | 8/2003 | Hoshi | 359/486 |
| 2003/0235272 | A1 * | 12/2003 | Appleby et al. | 378/147 |
| 2004/0130786 | A1 * | 7/2004 | Putnam et al. | 359/566 |
| 2009/0057581 | A1 * | 3/2009 | Pinchot | 250/506.1 |
| 2010/0214659 | A1 * | 8/2010 | Levola | 359/566 |
| 2011/0081004 | A1 * | 4/2011 | Harding et al. | 378/147 |
| 2011/0291016 | A1 * | 12/2011 | Metzler et al. | 378/147 |

* cited by examiner

Primary Examiner — Brooke Purinton
(74) Attorney, Agent, or Firm — Peter Kendall

(57) ABSTRACT

A photon collimator, suitable for use in medical imaging equipment, is constructed from a block of photon-attenuating material, such as solid tungsten or molybdenum alloy that defines a plurality of integrally formed septa slats. Each slat has an elongated length dimension greater than thickness and depth dimensions, and is oriented in an opposed pattern array that is laterally spaced relative to its respective thickness dimension. An aperture channel is defined between each pair of opposed slats. Rows of integrally formed slats in one block or separately affixed blocks may be stacked on each other at skewed angles to form two-dimensional grids of apertures having polygonal cross sections. The slats may be formed by electric discharge or laser thermal ablation machining, such as by a sequential passing of an EDM wire cutting head along the pattern array, repeating sequential cutting of respective channel depth and width.

9 Claims, 7 Drawing Sheets

MULTILAYER, MULTIAPERTURE COLLIMATOR FOR MEDICAL IMAGING AND FABRICATION METHOD

CLAIM TO PRIORITY

This application claims the benefit of co-pending United States provisional patent application entitled "Crossed-Slat Collimator Formed by Wire-EDM Process", filed Sep. 26, 2011 and assigned Ser. No. 61/539,015, which is incorporated by reference herein.

BACKGROUND OF THE DISCLOSURE

1. Field of the Invention

The invention relates to photon collimators, and more particularly collimators suitable for medical imaging apparatus that are fabricated with electric discharge machining (EDM) techniques or other thermal ablation cutting techniques, such as laser cutting.

2. Description of the Prior Art

Photon collimators are utilized in medical imaging and therapy apparatus, such as gamma cameras, to allow passage of photons that have trajectory paths aligned with apertures that are defined by the collimator structure. Photons having non-aligned trajectory paths are blocked by the collimator structure. Known collimators are shown in FIGS. 1 and 2, and are often fabricated from relatively dense material-commonly lead alloys. FIG. 1 depicts a known type of cast lead alloy collimator 20, having a matrix-like array of cast-in-place aperture through holes 22 that are aligned along respective length and width axes 24, 26. The apertures 22 are often formed by casting molten lead around a matrix grid of mold pins (not shown).

FIG. 2 depicts another known type of fabricated lead alloy collimator 30 having a matrix-like array of aperture through holes 32 that is formed from a repetitive pattern of opposing lead foil strips 34, 36 that are bonded together with a layer of glue 38. Each opposed face of the foil strips 34, 36 is calendered (i.e., compressed or squeezed) with a series of half-polygonal (e.g., semi-circular or half-hexagonal) impressions that when joined together in opposed fashion along the glue layer 38 form each individual aperture 32. Adjoining pairs of lead strips 34, 36 are in turn bonded with glue layers 38 to form a unitized, fabricated collimator structure 30.

Some jurisdictions are discouraging use of lead components in general, including medical equipment. Hence, there is a perceived need to replace lead alloys in medical and other equipment collimators with substitute dense alloy materials. Tungsten (W) and Molybdenum (Mo) alloys are being considered as lead substitutes in collimators, but their hardness and relatively high melting temperatures make them more difficult to fabricate for collimators. Some low energy-level collimators have been fabricated from molybdenum foil, but the foil thickness is too thin for the photon energy levels and density normally required for human medical imaging apparatus. Some attempts have been made to fabricate smaller collimators not suitable for human medical imaging by laser sintering molybdenum and tungsten powders. However, laser sintering complex grid patterns of the size necessary for medical imaging photon collimators is relatively time consuming and expensive.

Tungsten and molybdenum alloys are not as easily cast as lead to meet high precision tolerances required for medical imaging collimators—often requiring less than 1/20 degree variation between adjoining apertures. Due to material hardness properties, tungsten alloys are not readily calendered in precision foil strips of sufficient thickness for medical imaging collimators, or readily mechanically machined (e.g., by drilling or milling). It is difficult to maintain inter-aperture size, shape and spacing variation within acceptable tolerances by mechanical machining techniques. While some relatively small collimators for less than human size imaging apparatus have been fabricated by EDM cutting individual apertures, a typical gamma camera collimator for human patients requires fabrication of thousands of aperture holes in a precision matrix-like grid. Mechanically machining or thermal ablation cutting such a large quantity of individual apertures is time consuming and costly.

Thus, a need exists in the art for a photon collimator that can be fabricated with inter-aperture size, shape and/or spacing variation tolerances required for human-sized medical imaging equipment.

Another need exists in the art for a non-lead alloy photon collimator that can be fabricated from tungsten, molybdenum or other photon-attenuating alloys with known, cost-effective machining techniques and equipment.

An additional need exists in the art for a photon collimator that can be fabricated with fewer forming operations otherwise required to fabricate a matrix-like grid of individual aperture holes on a one-by-one basis.

SUMMARY OF THE INVENTION

Accordingly, an object of the present invention is to create a photon collimator that can be fabricated from tungsten, molybdenum or other photon-attenuating alloys, and meet the aperture variation tolerances required for human-sized medical imaging equipment.

Another object of the present invention is to create a photon collimator that can be fabricated from tungsten, molybdenum and other non-lead alloys, with known, cost-effective fabrication techniques and equipment.

An additional object of the present invention is to create a non-lead alloy photon collimator that can be fabricated with fewer forming operations otherwise required to fabricate a matrix-like grid of individual aperture holes on a one-by-one basis.

These and other objects are achieved in accordance with the present invention by a photon collimator, suitable for use in medical imaging or other equipment, that is constructed from a photon-attenuating material that defines a plurality of integrally formed septa slats. Each slat has an elongated length dimension greater than thickness and depth dimensions, and is oriented in an opposed pattern array that is laterally spaced relative to its respective thickness dimension. A one-dimensional (i.e., generally linear) aperture channel is defined between each pair of opposed slats. Rows of integrally formed slats and one-dimensional apertures in one collimator block or separately affixed collimator blocks may be stacked on each other at skewed angles to form grids of two-dimensional apertures having polygonal cross sections. The stacking of septa slats may be accomplished by machining layers of slats within a single block and/or stacking and affixing separate blocks on top of one another. The slats may be formed by electric discharge or laser thermal ablation machining, such as by a continuous pass of an EDM wire cutting head along the pattern array, repeating sequential cutting of respective channel depth and width, or by laser sintering the slats and their related support structure.

The present invention features a method for making a photon collimator, comprising cutting a plurality of elongated aperture channels through a block of photon-attenuating material by thermal ablation machining selected from the group consisting of electric discharge machining and laser machining. The respective channels have an elongated length dimension greater than width and depth dimensions and are oriented in a pattern array that is laterally spaced relative to their respective width dimensions, thereby leaving a pattern of opposed septa slats defining width and length dimensional boundaries of the aperture channels.

The present invention also features a photon collimator, comprising a block of photon-attenuating material defining a plurality of integrally formed septa slats. Each slat has an elongated length dimension greater than thickness and depth dimensions, and is oriented in an opposed pattern array that is laterally spaced relative to its respective thickness dimension. An aperture channel is defined between each pair of opposed slats.

The present invention additionally features a photon collimator that is constructed from a block of photon-attenuating material, defining first and second pluralities of integrally formed planar septa slats on opposite sides of the block that are skewed in relative alignment with each other. Each slat in each respective plurality of slats has an elongated length dimension greater than its thickness and depth dimensions, and is oriented in an opposed pattern array that is laterally spaced relative to its thickness dimension. The collimator also has respective first and second aperture channels between each corresponding pair of respective opposing first and second pluralities of slats. The respective first and second aperture channels are in communication with each other and form a pattern of polygonal cross-section through-apertures.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in the fabrication of photon collimators, comprising a block of photon-attenuating material, including lead or non-lead alloys, such as by way of non-limiting example tungsten or molybdenum alloys, defining a plurality of integrally formed septa slats, each slat having an elongated length dimension greater than its thickness and depth dimensions, and oriented in an opposed pattern array that is laterally spaced relative to its thickness dimension; and an aperture channel defined between each pair of opposed slats. The slats are fabricated by cutting the elongated aperture channels with EDM or laser thermal ablation machining. The slats and supporting structure may also be fabricated by laser sintering non-lead alloy powders, such as powders comprising tungsten or molybdenum alloy powders.

Figure 1:
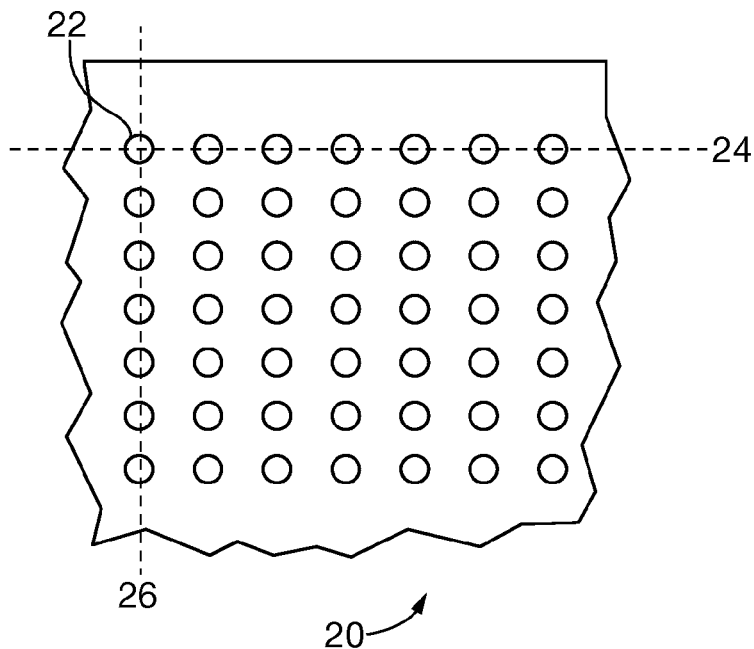
FIG. 1 is a plan view of a known cast lead collimator.
Figure 2:
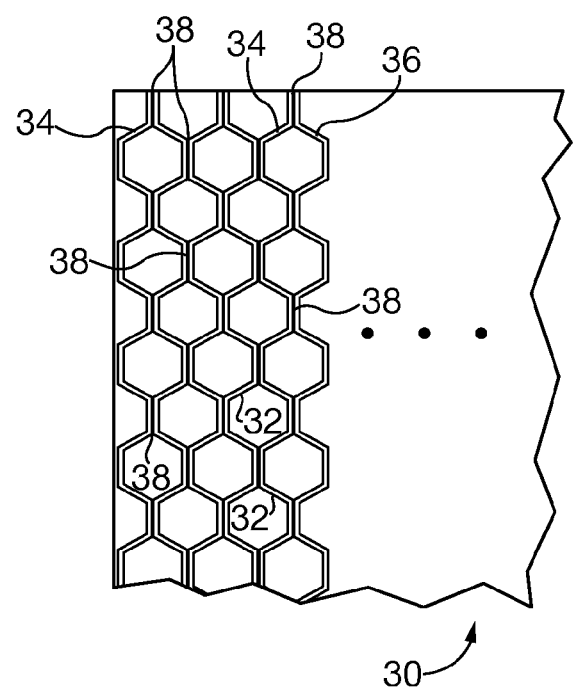
FIG. 2 is a plan view of a known fabricated lead foil collimator.
Figure 3:
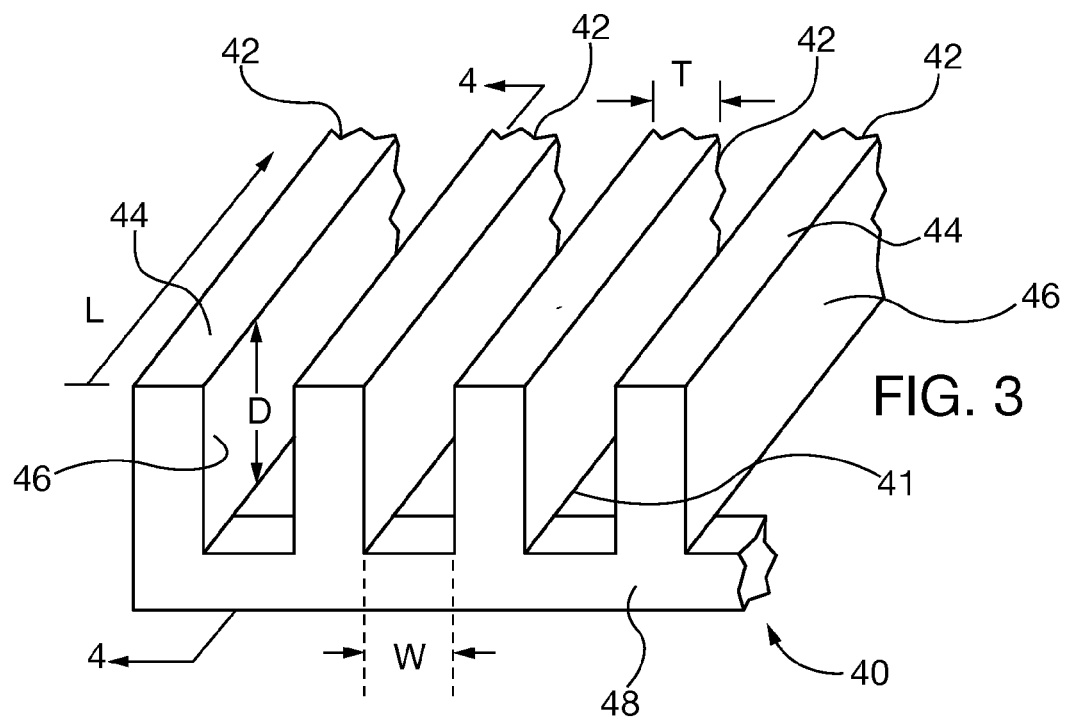
FIG. 3 is a perspective view of an embodiment of a one-dimensional slat collimator of the present invention.
Figure 4:
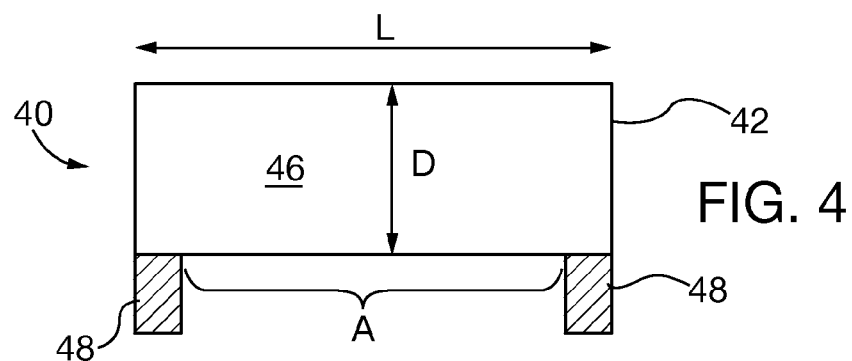
FIG. 4 is a cross sectional view of the collimator of FIG. 3.
Figure 5:
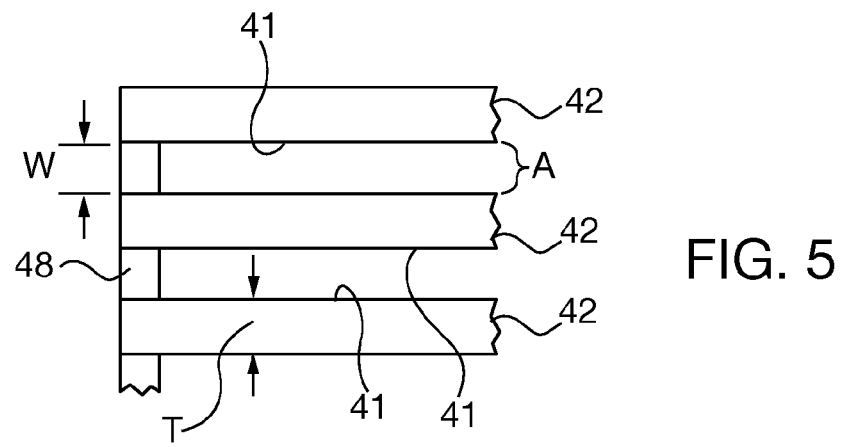
FIG. 5 is an plan view of the collimator of FIG. 3.

FIGS. 3-5 show an embodiment of a one-dimensional collimator 40 that is constructed in accordance with the teachings of the present invention. The collimator 40 is fabricated from a block of photon-attenuating material, such as a solid block of tungsten or molybdenum alloy, or laser sintered from powders comprising those alloys. The collimator 40 has an array of elongated, aligned one-dimensional (i.e., generally linear) aperture channels 41 of dimensional width W (here shown having rectangular projection cross-sectional profile A) that is defined between septa slats 42. Each slat 42 has a top face 44 defining a slat thickness T and side faces 46 that define slat length L and depth D. The septa slats 42 are shown schematically and are not drawn to scale. For example, slat 42 may have a thickness T of 0.125-2.0 mm (0.005-0.078 in), depth D of 24-50 mm (0.45-2.0 in), and an aperture width W spacing between slats of 1.0-1.5mm (0.039-0.138 in). A typical collimator 40 may have an overall slat 42 length L of 400 mm (15 in) and have a slat array overall width of 600 mm (21 in). Thus a typical collimator 40 may have over 300 machined slats in an array. The slats 42 are affixed in relative position to each other by machined in place rails 48 that are oriented laterally relative to the slats.

Figure 6:
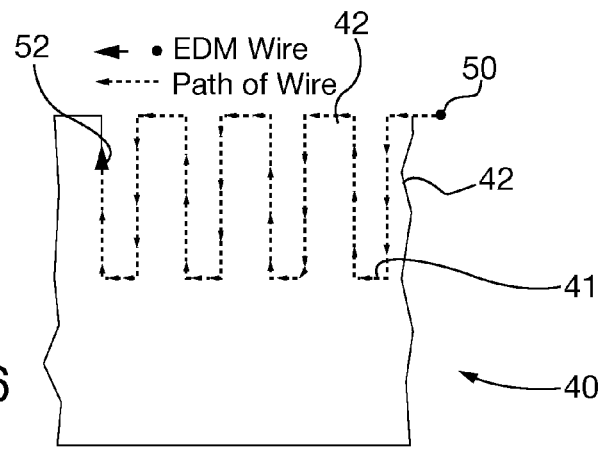
FIG. 6 is a schematic elevational view showing an embodiment of an EDM cutting sequence for formation of plural septa plates.
Figure 7:
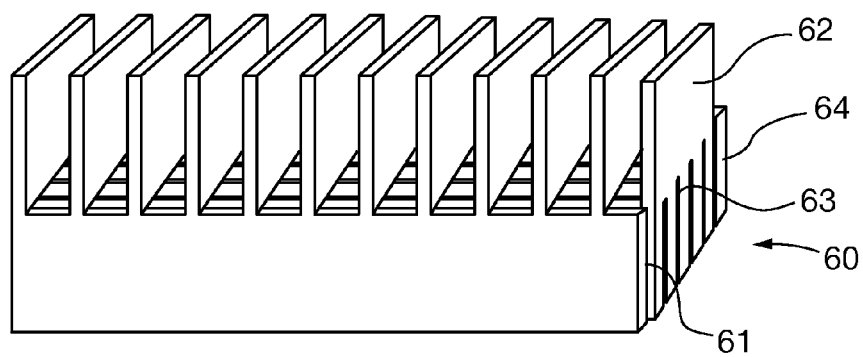
FIG. 7 is a perspective view of an embodiment of a two-dimensional slat collimator of the present invention, having first and second arrays of skewed, stacked septa plates.
Figure 8:
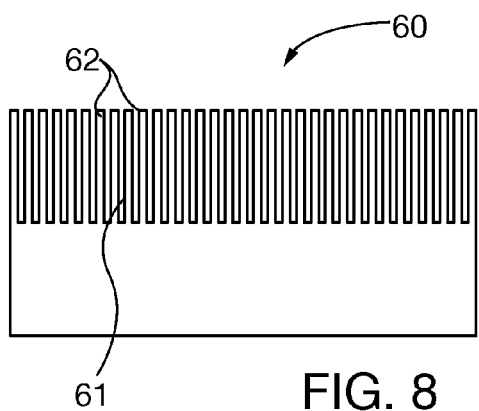
FIG. 8 is a front elevational view of the collimator of FIG. 7.
Figure 9:
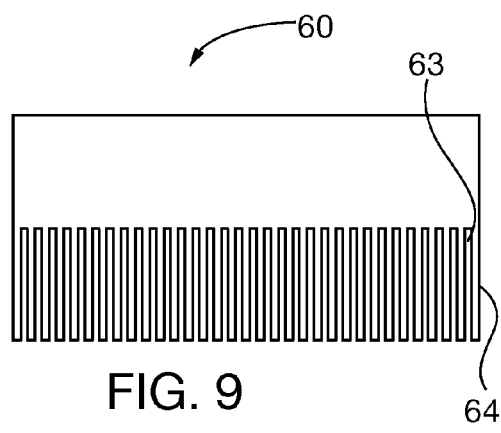
FIG. 9 is a side elevational view of the collimator of FIG. 7.
Figure 10:
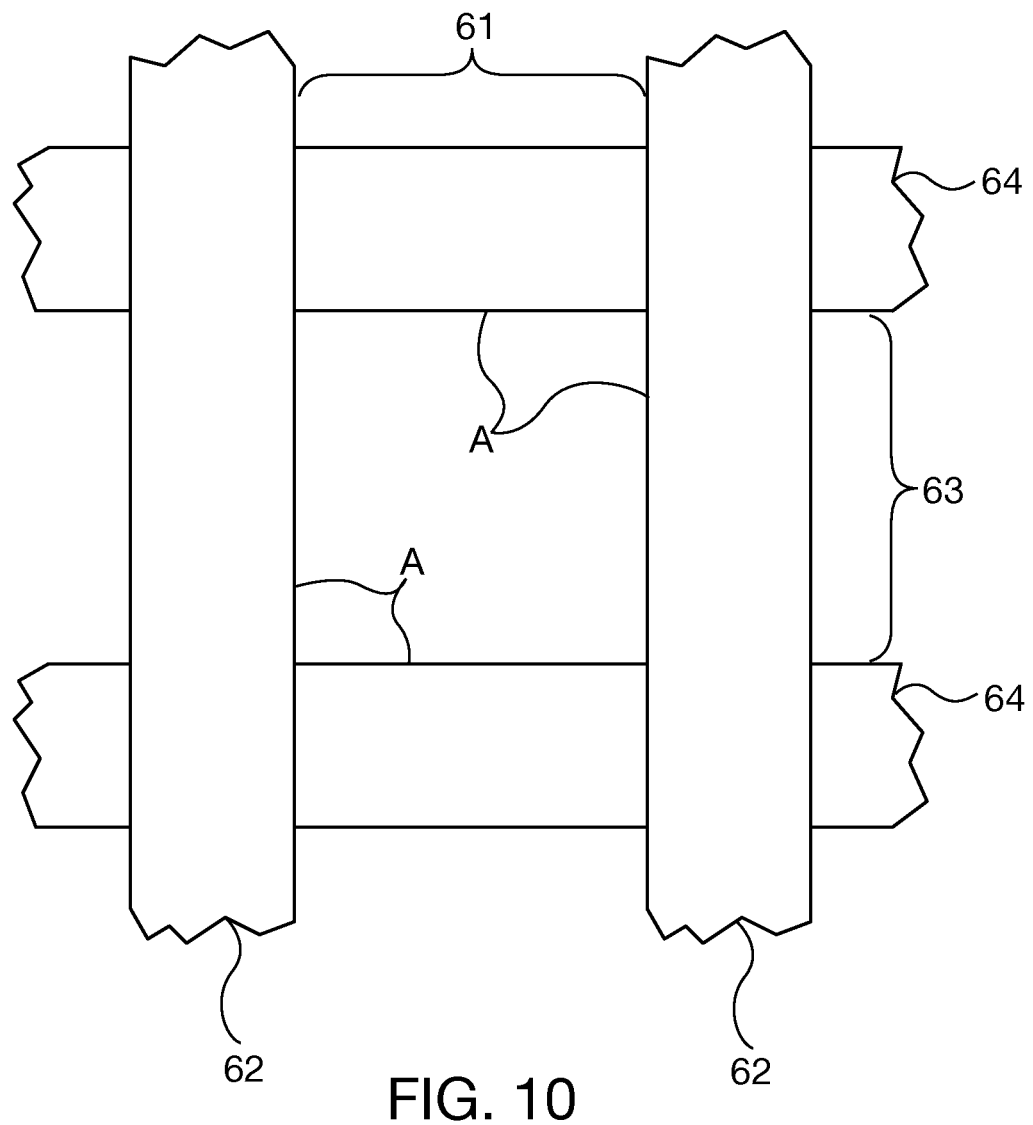
FIG. 10 is a top plan view of the collimator of FIG. 7.

As shown in FIG. 6, the collimator 40 slats 42 are formed within a block, such as tungsten or molybdenum alloys, by moving a heat ablation cutting tool, such as a laser or EDM head in a pathway shown schematically as dash-dot line 52. Alternatively the material in the profile shown in the dash-dot line may be removed by plunge-cutting with a laser or EDM head in the depth D dimension. The removed material forms the channel slots 41. A through-passage is completed between the channel slots 41, to create the apertures A, by cutting the back side of the block opposite the slats 42, and also forming the rails 48. Thus in a single cutting pass sequence 52 from the top and another cutting pass sequence from the bottom an entire matrix of polygonal apertures A is formed, without the necessity of individually forming each aperture hole as required in known collimators 20, 30 or drilled tungsten collimators.

FIGS. 7-10 show an alternative embodiment two-dimensional aperture array collimator 60 that has a first plurality of septa slats 62 oriented in a first direction and a second plurality of septa slats 64 that are machined in the same material block. Slats 62 and slats 64 are oriented in skewed (here orthogonal) relationship to each other, thus defining respective aperture channels 61, 63 that when combined form a matrix or grid of two-dimensional rectangular or square polygonal cross-section apertures A. The aperture A profile may be selectively varied by changing respective slat 62, 64 thickness and spacing. As one skilled in the art can appreciate the two-dimensional aperture collimator 60 may be formed by cutting one side of septa slats 62 or 64, as shown in FIG. 6, then cutting the opposite side so that the apertures on both sides are in open communication. The cross-sectional polygonal profile of the combined two-dimensional apertures A (e.g., square or rectangular) establishes the photon collimation profile that enables passage of photons having trajectories in alignment with the aperture and attenuates photons that do not have an aligned trajectory. Thus, with as little as two continuous EDM or laser ablation tool cutting passes (or a relatively simple pair of skewed laser sintered arrays), a grid of thousands of apertures A may be formed quickly with the high precision required for collimator applications. It would be considerably more time consuming and expensive to cut or sinter thousands of individual apertures in a single collimator by thermal ablation (e.g., laser or EDM) or laser sintering from alloy powders, while maintaining cutting and grid alignment tolerances.

Figure 11:
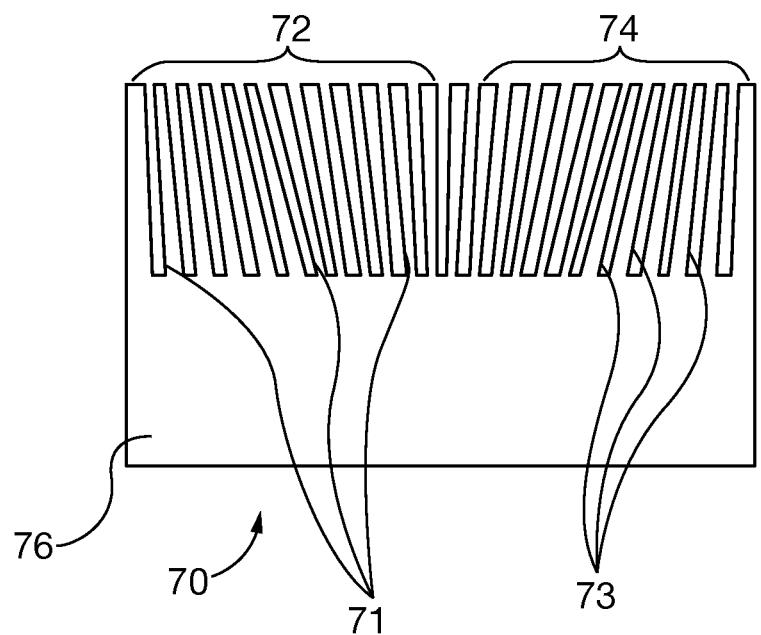
FIG. 11 is a front elevational view of a variable-focus collimator embodiment of the present invention.
Figure 12:
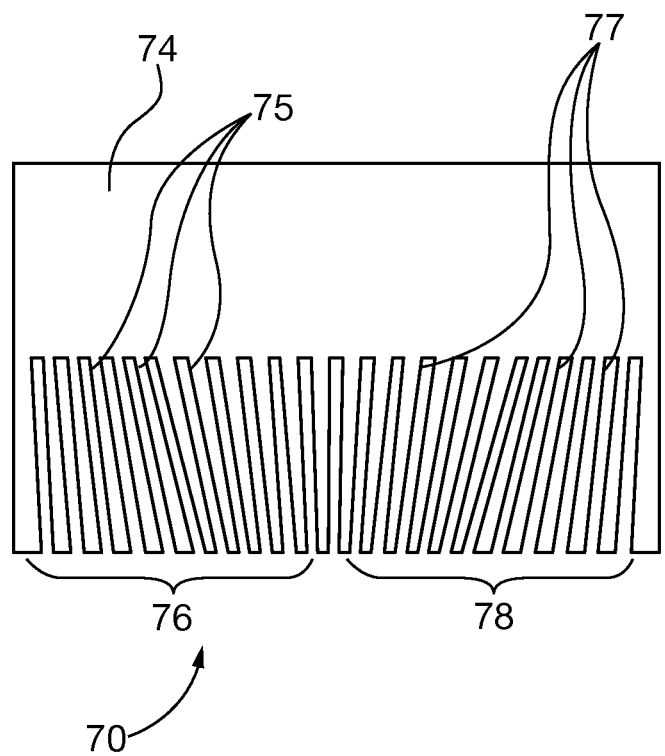
FIG. 12 a side elevational view of the variable-focus collimator embodiment FIG. 11.

FIGS. 11-12 show a variable-focus collimator 70 that focuses photons along lines at the same or different focal lines, or focal lines that vary symmetrically across the collimator. The variable-focus collimator 70 has a first focal collimator having first and second pluralities of integrally formed septa slats 72, 74 respectively oriented in first and second opposed pattern arrays, wherein the first and second pattern arrays are skewed in converging relative alignment with each other; and respective pluralities of first and second aperture channels 71, 73 between each pair of opposing slats 72, 74 that collectively define a focusing beam path.

The variable-focus collimator 70 also has a second focal collimator on an opposite side of the solid block from the first and second arrays 72, 74, having third and fourth pluralities of integrally formed septa slats 76, 78, respectively oriented in third and fourth opposed pattern arrays, wherein the third and fourth pattern arrays are skewed in converging relative alignment with each other. Respective pluralities of third and fourth aperture channels 75, 77 are formed between each pair of opposing slats 76, 78. The respective first and second pluralities of slats pattern arrays 72, 74 are generally orthogonally aligned relative to the third and fourth pluralities of slats 76, 78 pattern arrays and form polygonal cross-section through-apertures. While the embodiment in FIGS. 11 and 12 shows a focusing collimator, one skilled in the art can appreciate that the septa slats can be constructed in any profile and arrays of slats can be oriented in any relative position necessary to direct the photon beams. Thus one may construct a focusing or diverging trajectory photon collimator as well as a parallel trajectory photon collimator. More particularly, the respective first and second variable-focus collimators may each focus to a line at the same focal distance (cone beam), to lines at different focal distance (astigmatic cone beam), or each may have focal lines which are variable across the collimator array surface.

Figure 13:
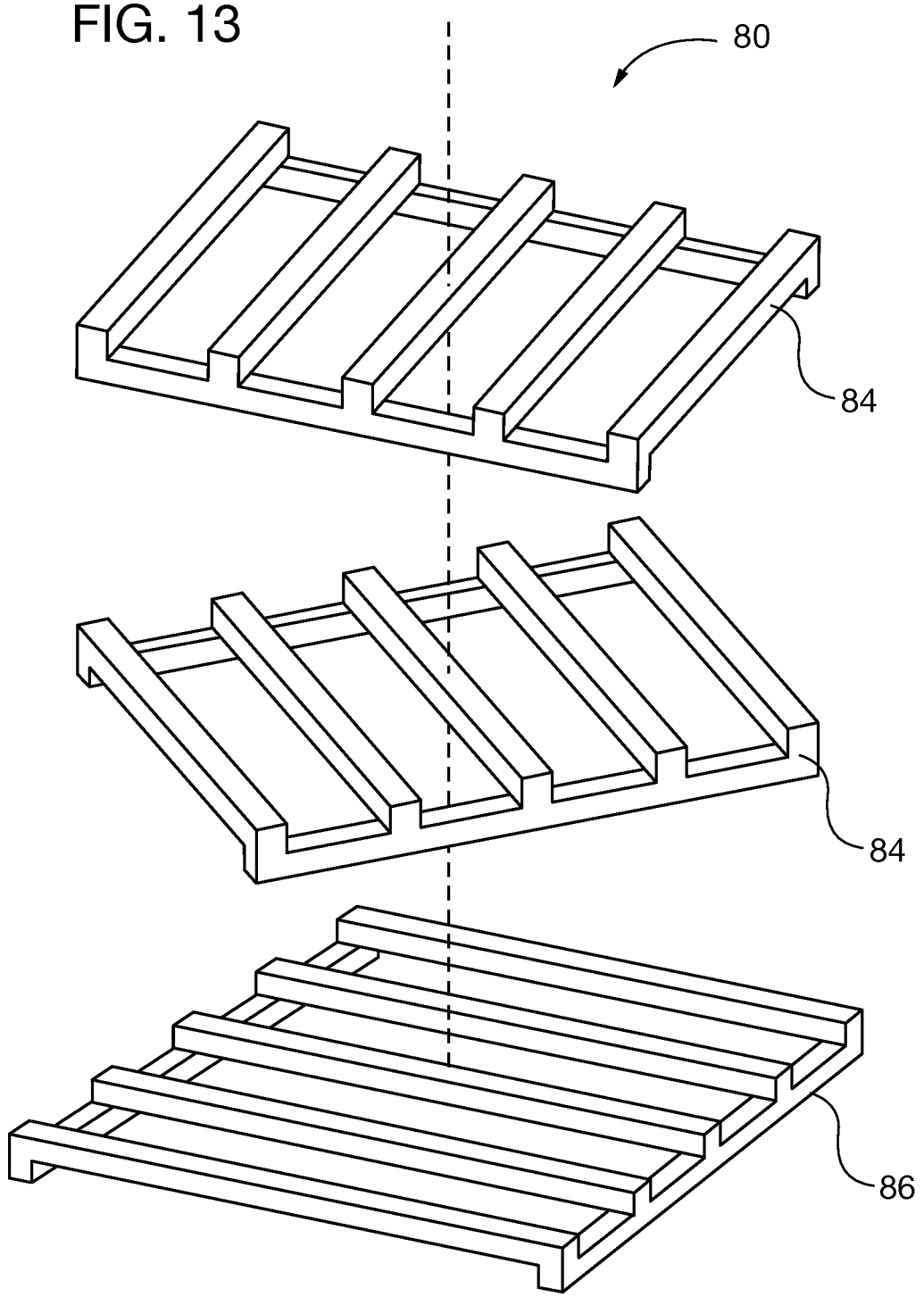
FIG. 13 is an exploded view of a stacked collimator embodiment of the present invention.
Figure 14:
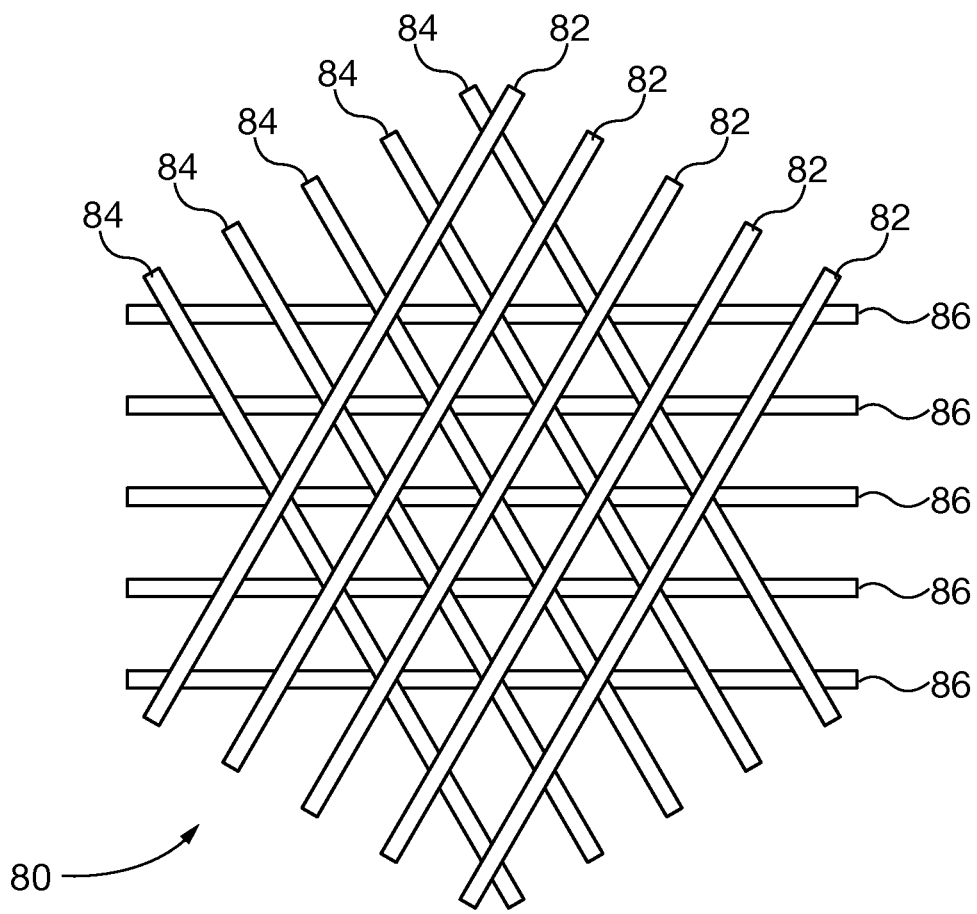
FIG. 14 is a top plan view of the collimator of FIG. 13.

Collimator arrays of septa slats may be stacked and affixed relative to each other in order to create a stacked collimator assembly with planform projection apertures of any desired profile. As shown in FIGS. 13 and 14, a stacked collimator 80 comprises three tungsten blocks 82, 84, 86 having septa slats are stacked and affixed relative to each other in order to create triangular profile apertures A interspersed within the grid pattern. Other polygonal aperture shapes, such as rectangles, squares, octagons diamonds, and triangles may be formed by stacking and skewing collimator arrays, but will impact the "packing" density and efficiency of the collimator. Variances in aperture shapes interspersed within the grid pattern that may arise from utilization of stacked slats are compensated for during collimator calibration.

Figure 15:
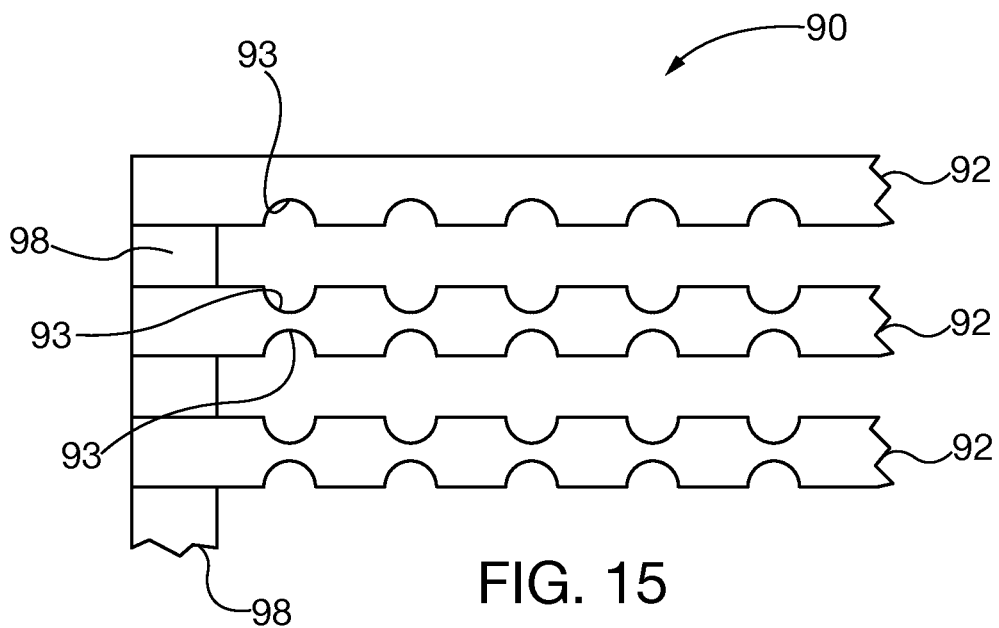
FIG. 15 is a top plan view of another collimator embodiment of the present invention.

Referring to FIG. 15, collimator 90 has septa slat 92 profiles that include slat apertures 93 formed therein during the slat cutting process as the EDM wire or laser cutting head translates along the length L of the slat. The slat apertures 93 may be formed in other polygonal profiles. In this exemplary embodiment the slats 92 are affixed to rails 98, similar to the embodiment of FIGS. 3-5. The collimator 90 structure may also be fabricated using laser sintering methods.

Although various embodiments which incorporate the teachings of the present invention have been shown and described in detail herein, those skilled in the art can readily devise many other varied embodiments that still incorporate these teachings. For example collimator apertures and septa slats may be constructed with other polygonal profiles and oriented in other desired relative spacing in order to achieve desired photon beam orientation. The collimator embodiments shown herein may be fabricated from alloys other than tungsten or molybdenum, including lead.

What is claimed is:

1. A photon collimator, comprising:
   a monolithic block of absorptive photon-attenuating material having upper and lower opposite sides, the sides respectively having length and width, the monolithic block defining first and second pluralities of uninterrupted integrally formed continuous planar septa slats across the entire block length of a respective opposite block side;
   each slat in each respective first and second slat plurality having an elongated length dimension greater than its thickness and depth dimensions, with each respective plurality of slats oriented in a respective opposed pattern array that is laterally spaced along its respective block side width, the respective first and second pattern arrays skewed in relative alignment and in contact with each other intermediate the upper and lower sides; and
   respective first and second uninterrupted aperture channel voids removed from respective opposite block sides that are defined between and along the entire length of each corresponding pair of respective opposing pluralities of slats; the respective first and second aperture channels in communication with each other and forming with the first and second slat pluralities arrays a pattern of polygonal cross-section through-apertures from the upper block side to the lower block side that define a collimator array.

2. The collimator of claim 1, further comprising:
   the respective first pluralities of septa slats and aperture channel voids forming a first variable-focus collimator, portions of the first plurality of septa slats respectively oriented in third and fourth opposed pattern arrays, which are skewed in converging relative alignment with each other;
   and respective pluralities of first and second aperture channels between each pair of opposing slats that collectively define a photon path.

3. The collimator of claim 2, further comprising: the respective second pluralities of septa slats and aperture channel voids forming a second variable-focus collimator on an opposite side of the block from the first variable-focus collimator, portions of the second plurality of septa slats respectively oriented in fifth and sixth opposed pattern arrays, which are skewed in converging relative alignment with each other; and wherein the respective third and fourth pluralities of slats pattern arrays are generally orthogonally aligned relative to the fifth and sixth pluralities of slats pattern arrays and form polygonal cross-section through-apertures.

4. The collimator of claim 3, wherein the respective first and second variable-focus collimators are constructed to form a collimator selected from the group consisting of cone beam, astigmatic beam or other symmetric beam collimators.

5. The collimator of claim 4, wherein the respective third and fourth pluralities of slats pattern arrays are orthogonally aligned relative to the respective fifth and sixth pluralities of slats pattern arrays and form square cross-section through-apertures.

6. The collimator of claim 1 formed from material comprising a solid block of tungsten or molybdenum alloy.

7. The collimator of claim 1, formed from material comprising a block of laser sintered tungsten or molybdenum alloy.

8. The collimator of claim 1, wherein the respective first and second pluralities of slats are orthogonally aligned relative to each other and form rectangular cross-section through-apertures.

9. The collimator of claim 8, wherein the respective first and second pluralities of slats are equally spaced relative to each other and form square cross-section through-apertures.

* * * * *